No. 835,613. PATENTED NOV. 13, 1906.
E. J. HAYES.
GLASS PRESS.
APPLICATION FILED MAR. 17, 1906.

3 SHEETS—SHEET 1.

Witnesses
T. L. Cochrane
William W. Deane

Inventor
Edward J. Hayes

By
Attorney

No. 835,613. PATENTED NOV. 13, 1906.
E. J. HAYES.
GLASS PRESS.
APPLICATION FILED MAR. 17, 1906.

3 SHEETS—SHEET 2.

Witnesses
T. L. ___
William W. Deane

Inventor
Edward J. Hayes,
By ___
Attorney

No. 835,613. PATENTED NOV. 13, 1906.
E. J. HAYES.
GLASS PRESS.
APPLICATION FILED MAR. 17, 1906.
3 SHEETS—SHEET 3.
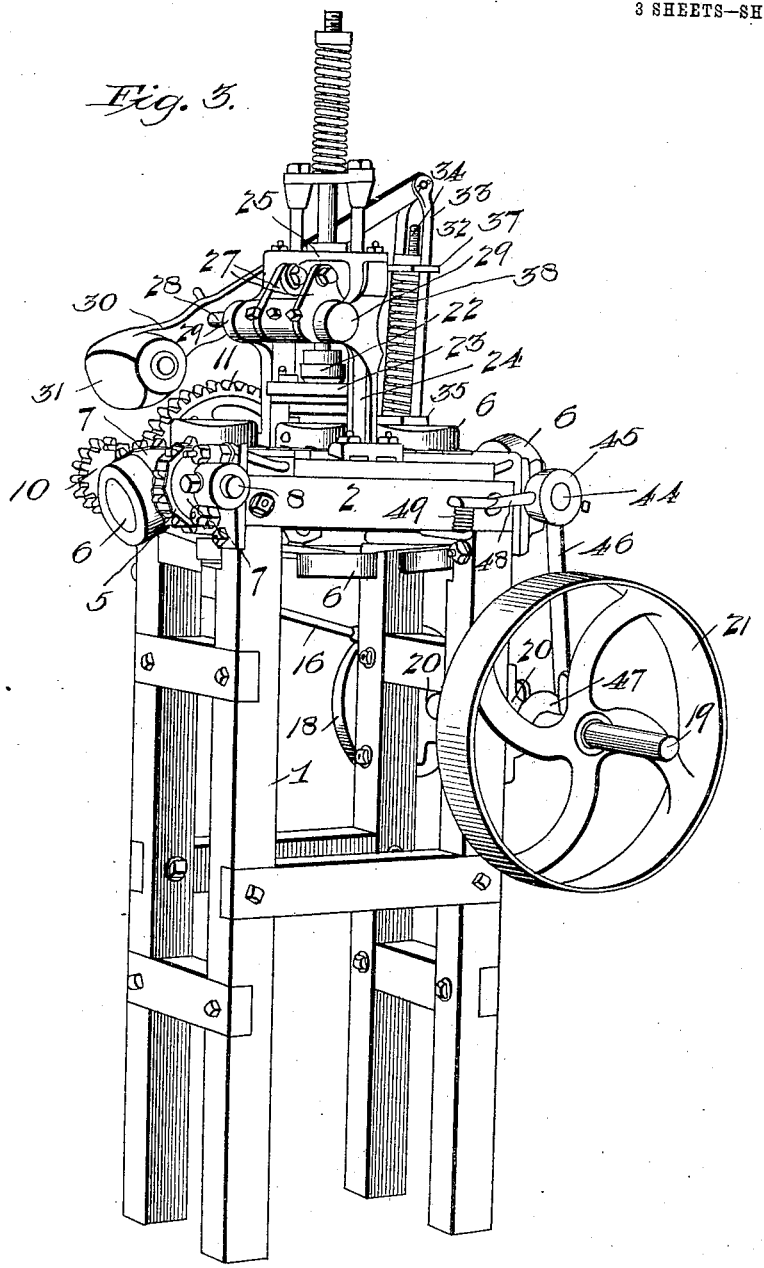
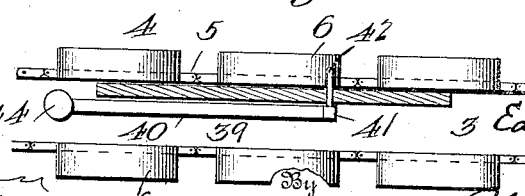

UNITED STATES PATENT OFFICE.

EDWARD J. HAYES, OF MARION, INDIANA.

GLASS-PRESS.

No. 835,613.  Specification of Letters Patent.  Patented Nov. 13, 1906.

Application filed March 17, 1906. Serial No. 306,674.

*To all whom it may concern:*

Be it known that I, EDWARD J. HAYES, a citizen of the United States, residing at Marion, in the county of Grant and State of Indiana, have invented certain new and useful Improvements in Glass-Presses, of which the following is a specification.

This invention relates to the art of manufacturing pressed glassware, such as liners for the metal caps of fruit-jars, nappies, and other articles of glassware usually manufactured by means of a press embodying a mold and a plunger coöperating therewith.

To this end the invention contemplates certain novel and practical improvements in a glass-press of the type heretofore usually operated manually, whereby said press is converted into strictly a power-machine embodying means for facilitating and accelerating the manufacture of the glass articles.

A special feature of the invention is the provision of improved operating mechanism for the molds and plunger which permits the expansion of the glass in the molds in order that the article may be made of full weight; and another practical improvement resides in the provision of a mold-alining device which insures the checking of the momentum of the traveling mold and arresting the latter in accurate alinement under the plunger as the latter descends to press the glass.

With these and other objects in view the invention consists in the novel construction, combination, and arrangement of parts hereinafter more fully described, illustrated, and claimed.

The essential features of the invention involved in carrying out the objects above indicated are necessarily susceptible to structural modification without departing from the scope of the invention; but a preferred embodiment of the latter is shown in the accompanying drawings, in which—

Figures 1, 4:
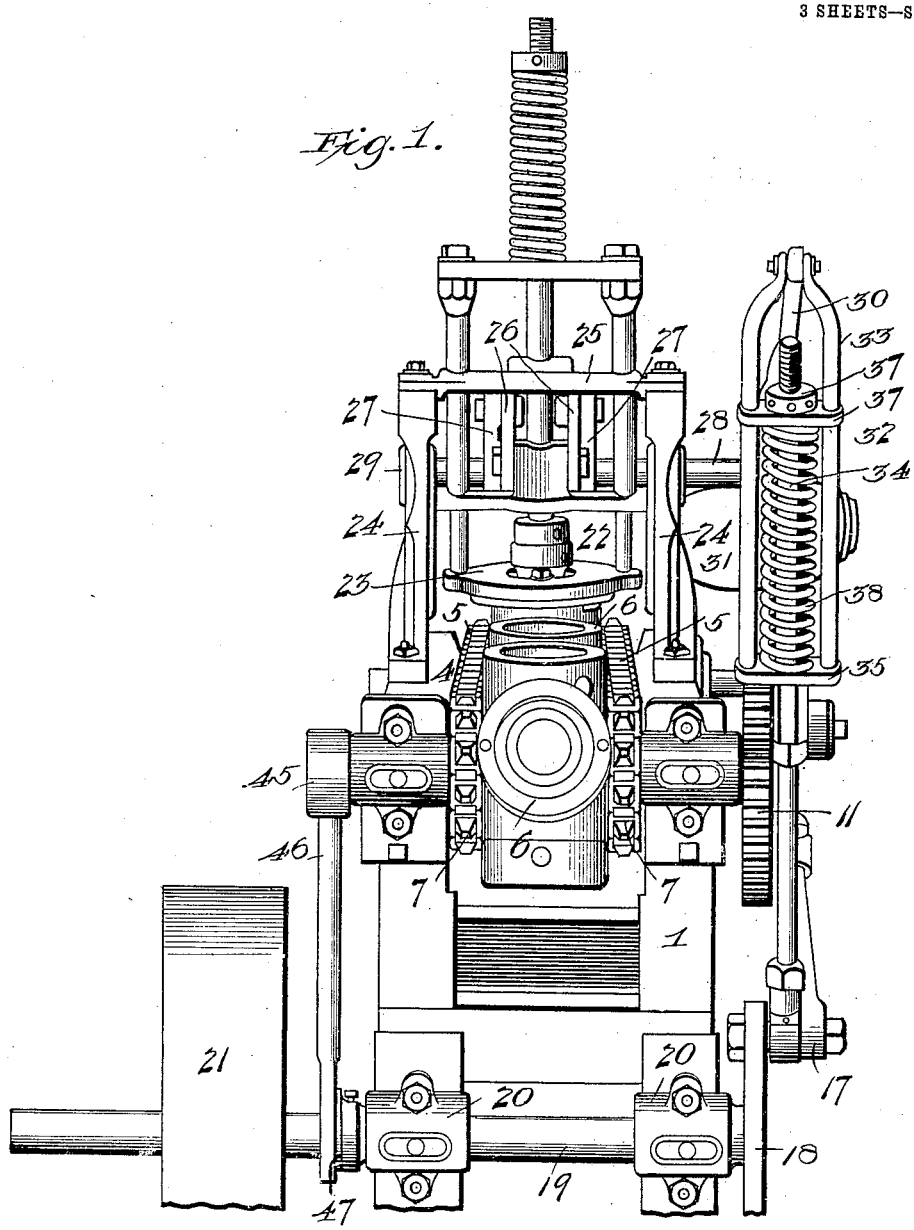
Figure 2:
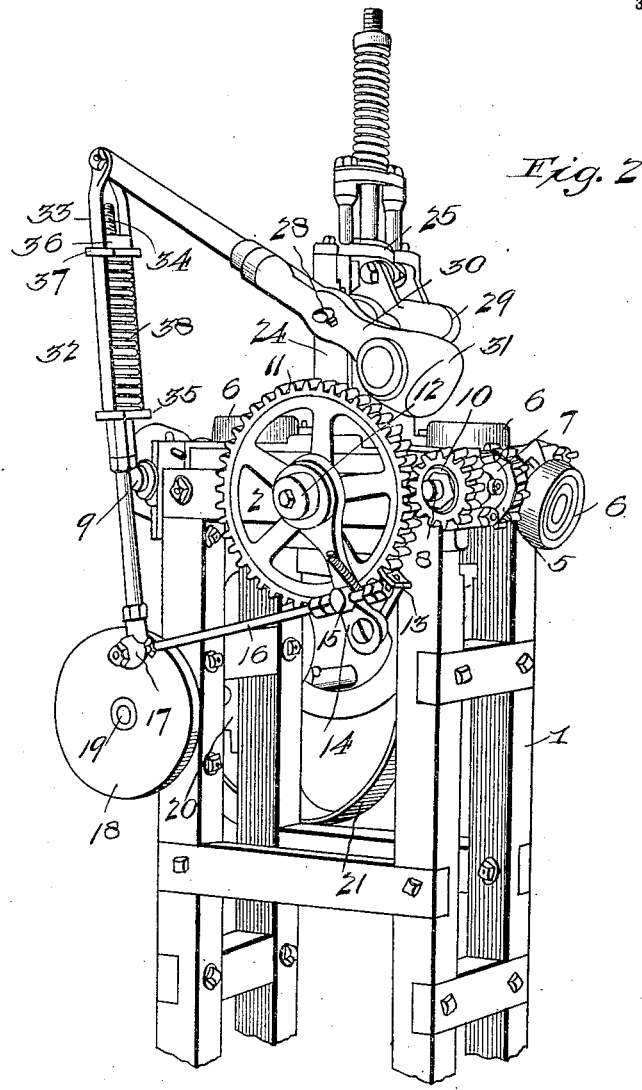
Figure 6:
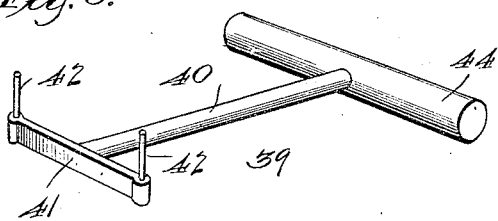

Figure 1 is a front perspective view of a glass-press embodying the present invention. Fig. 2 is a perspective view of the press from one side thereof. Fig. 3 is a perspective view of the press viewed from the side opposite to that shown in Fig. 2. Fig. 4 is a detailed top plan view of the molding-table portion of the press, illustrating the relation of the traveling molds to the mold alining or stop device. Fig. 5 is a detail sectional view on the line 5 5 of Fig. 4. Fig. 6 is a detail in perspective of the stop member of the mold-alining device.

Like references designate corresponding parts in the several figures of the drawings.

In carrying out the present invention some features of the ordinary glass-press are preserved, as the improvements claimed herein relate particularly to the power-operating mechanism and its various accessories and to the mold-alining device. However, the preferable complete embodiment of the invention is shown in the drawings, in which the numeral 1 designates the machine-supporting stand, having a horizontal top portion 2, within which is arranged a horizontal molding-table 3. Over this table is arranged to operate an endless mold-carrier essentially consisting of an endless belt of mold-cups 6 arranged to travel above and below the table 3 and connected to and carried with a pair of opposite parallel carrier-chains 5. Hence the endless or traveling mold-carrier consists of the opposite carrier or sprocket chains 5 and a plurality of the open mold-cups 6, arranged in regularly-spaced relation and swung between the chains. As the carrier is moved the molds are carried in upright position over the upper side of the molding-table 3 to receive therein the supply of glass to be pressed into shape under the pressure of the plunger to be presently referred to.

The opposite chains 5 of the mold-carrier are arranged to pass over the supporting and guiding sprocket-wheels 7, arranged in pairs at opposite ends of the top portion 2 of the machine-stand and mounted on the oppositely-located carrier-shafts 8 and 9, respectively. The location of these shafts beyond the ends of the molding-table causes the separate horizontal runs of the carrier to travel, respectively, above and below the molding-table, while at the same time the molds reach and assume a discharging position as they pass over one of the carrier-shafts, in which discharging position (see Fig. 1) the glass is turned out of the mold-cup and falls into a receptacle in the usual way.

To provide for the proper intermittent feed of the endless traveling mold-carrier 4 5, there is associated with the same the improved power-operating mechanism claimed herein. This mechanism includes a driven pinion 10, mounted on one end of the carrier-shaft 8 and meshing with a ratchet spur-gear 11, having a journal-support 12 at one side of the machine-supporting stand and intermittently rotated under the influence of a spring-held propelling-dog 13, carried by a swinging ratchet-arm 14, loosely swung at one end from the axis or journal support 12 of the spur-gear 11. The said swinging ratchet-arm 14 has suitably connected therewith, as at 15, a reciprocating crank-rod 16, whose opposite end has a wrist-pin connection 17 with a driving crank-wheel 18. This crank-wheel is mounted on one end of a drive-shaft 19, journaled in suitable bearings 20, fitted to one end of the machine-supporting stand, and the end portion of the said shaft opposite the wheel 18 has mounted thereon a belt wheel or pulley 21, which receives the driving-belt from any suitable power-motor either of the electrical, steam, or gas type.

Coöperating with the mold-cups 4 as they are worked over the molding-table 3 is a reciprocating pressing-plunger 22. This plunger is associated with the ordinary guard-cover 23, common to this type of glass-press, and said parts are arranged for support and operation within the usual upright guide-frame 24, surmounting the top portion 2 of the machine-stand and overhanging the molding-table. The relation and action of the plunger 22 and the guard-cover 23 are well understood by those familiar with the art; but to illustrate the application of the improved operating mechanism to the plunger device it is to be observed that the plunger 22 has associated therewith the plunger-operating cross-head 25, reciprocally arranged within the guide-frame 24 and having connected therewith the pivotal links 26. The links 26 are also pivotally connected to the rock-arms 27, carried by a rocker-shaft 28, journaled in bearings 29, provided on one side of the standards of the guide-frame 24. The shaft 28 is horizontally arranged and has fitted to one end thereof an overbalance operating-lever 30, carrying at one side of its axis a weight element 31 and having connected to its other end a compensating pitman 32. The other end of this pitman is pivotally connected by the wrist-pin connection 17 to the crank-wheel 18.

The compensating pitman by reason of its special arrangement and connections is a practical feature of the operating mechanism, inasmuch as it permits the expansion of the glass in the mold when the plunger enters the same, thereby causing the article to be made of the full weight of so much of the glass as the gatherer may have placed in the mold. The said compensating pitman 32 essentially consists of a yoke member 33 and a sliding rod member 34. The rod member 34 slides through a guide-strap 35 at one end of the yoke 33, and the end of the rod within the yoke is adjustably connected, as at 36, with a cross-head 37 sliding upon the sides of the yoke. A pressure draw-spring 38 is coiled on the rod member 34 and is interposed between the sliding cross-head 37 and the guide-strap 35.

The alining device for the molds embodies in its construction what may be properly termed a vertically-swinging "stop member" 39. This stop member essentially consists of a carrying-rod 40, supporting at one end a cross-arm 41, carrying at its extremities upstanding stop-pins 42, adapted to be projected through pin-openings 43 in the molding-table 3, as plainly shown in Figs. 4 and 5 of the drawings. The end of the rod 40 opposite the pins is fitted to a transverse rock-shaft 44, journaled in suitable bearings at one end of the machine-stand and carrying at one end upon the outside of the frame a collar element 45. This collar element has pendent therefrom an operating-rod 46, the lower free end of which is arranged at one side of an actuating-cam 47 on the drive-shaft 19. The said collar element 45 also has extended therefrom at an angle to the rod 46 an auxiliary operating-arm 48, beneath which is arranged an actuating-spring 49, exerting a pressure in a direction for oscillating the shaft 44 in a contrary direction to that caused by the throw of the cam 47 against the rod 46.

It will be observed that the construction described provides means whereby the stop-pins 42 will be projected into the path of a mold as it approaches a correctly-alined position beneath the plunger, so that by the time the plunger starts into the mold the latter has been checked and held in the proper position of alinement so that a perfect pressing operation may be carried out.

I claim—

1. In a glass-press, the machine-stand having a molding-table, an endless mold-carrier working over said table and including a carrier-shaft having a driven pinion, a ratchet-operated spur-gear meshing with said pinion, a plunger-operating device including a rock-shaft, a weighted operating-lever fitted to said rock-shaft, a drive-shaft having a crank member, and operating connection between the said crank member and said ratchet-operated spur-gear and said lever respectively.

2. In a glass-press, the machine-stand having a molding-table, an endless mold-carrier working over said table and including a carrier-shaft having a driven pinion, a spur-gear meshing with said pinion, a swinging ratchet-arm carrying a propelling-dog engaging said spur-gear, a drive-shaft having a crank-wheel, a crank-rod connected with said crank-wheel and the ratchet-arm, a plunger-operating device including a rock-shaft, a weighted operating-lever fitted to said rock-shaft, and a sectional spring-pitman connected to said lever and to the wrist of said crank-wheel.

3. In a glass-press, the machine-stand having a molding-table an endless mold-carrier, a plunger-operating device including a rock-shaft, a weighted operating-lever fitted to said rock-shaft, a drive-shaft having a crank-wheel, a ratchet-operating mechanism for the mold-carrier actuated by said crank-wheel, and a sectional spring-pitman connected to said lever and to the wrist of the crank-wheel, said pitman consisting of a yoke member, a rod member, a cross-head sliding within the yoke member and adjustably connected with the rod member, and a draw-spring interposed between said cross-head and one end of the yoke.

4. In a glass-press, a molding-table, an endless mold-carrier, the plunger, and an alining device comprising a rock-shaft carrying a vertically-swinging stop member provided with stop-pins adapted to be projected through the table at one side of a mold, said rock-shaft also carrying an operating-rod, and a spring-pressed auxiliary operating-arm disposed at an angle to the rod, and a shaft carrying a cam moving against said rod.

In testimony whereof I hereunto affix my signature in the presence of two witnesses.

EDWARD J. HAYES.

Witnesses:
LEWIS JAMES,
CHAS. WINSLOW.